United States Patent
Sodagar

(10) Patent No.: US 11,588,870 B2
(45) Date of Patent: Feb. 21, 2023

(54) W3C MEDIA EXTENSIONS FOR PROCESSING DASH AND CMAF INBAND EVENTS ALONG WITH MEDIA USING PROCESS@APPEND AND PROCESS@PLAY MODE

(71) Applicant: TENCENT AMERICA LLC, Palo Alto, CA (US)

(72) Inventor: Iraj Sodagar, Los Angeles, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 17/703,252

(22) Filed: Mar. 24, 2022

(65) Prior Publication Data

US 2022/0345506 A1 Oct. 27, 2022

Related U.S. Application Data

(60) Provisional application No. 63/177,791, filed on Apr. 21, 2021.

(51) Int. Cl.
*H04L 65/612* (2022.01)
*H04L 65/75* (2022.01)
*H04L 67/5651* (2022.01)

(52) U.S. Cl.
CPC .......... *H04L 65/612* (2022.05); *H04L 65/765* (2022.05); *H04L 67/5651* (2022.05)

(58) Field of Classification Search
CPC .. H04L 65/612; H04L 65/765; H04L 67/5651
See application file for complete search history.

(56) References Cited

U.S. PATENT DOCUMENTS

| | | | |
|---|---|---|---|
| 2002/0035616 A1* | 3/2002 | Diamond | H04M 3/42221 709/219 |
| 2016/0080450 A1* | 3/2016 | Kirkby | H04L 47/193 709/219 |
| 2021/0099510 A1 | 4/2021 | Sodagar | |

OTHER PUBLICATIONS

Dash Industry Forum, DASH-IF Implementation Guidelines: DASH events and timed metadata tracks timing and processing model and client reference model, Jul. 10, 2020, version 1.0.2 (Year: 2020).*

(Continued)

*Primary Examiner* — Wing F Chan
*Assistant Examiner* — Billy H Ng
(74) *Attorney, Agent, or Firm* — Sughrue Mion, PLLC

(57) ABSTRACT

A method and apparatus for processing events in a media stream may be provided. The method may include obtaining media data; generating, from the media data, one or more event segments and one or more media segments; parsing a respective event from the one or more event segments to determine an event start time, event end time, and dispatch mode; appending the respective event from the one or more event segments to an event dispatch buffer based on a comparison of the event start time and a current playback position, and a determination that the respective event is not present in an already dispatched buffer; and dispatching the respective event based on the position associated with the respective event in the event dispatch buffer, the event start time, the event end time, and the current playback position.

20 Claims, 10 Drawing Sheets

(56) References Cited

OTHER PUBLICATIONS

ISO/IEC JTC1/SC29/WG11; MPEG2019; M52458; "Coding of Moving Pictures and Audio"; Editor's Version of DASH IS 4th Edition; Jan. 2020, pp. 1-287.
Media Source Extensions™; W3C Recommendation, Nov. 17, 2016, pp. 1-77.
DASH-IF Implementation Guidelines: DASH events and timed metadata tracks timing and processing model and client reference model, DASH Industry Forum, Version 1.0.2 (Final), Jul. 10, 2020, pp. 1-21.
International Search Report dated Jul. 26, 2022 in International Application No. PCT/US22/21869.
Written Opinion of the International Searching Authority dated Jul. 26, 2022 in International Application No. PCT/US22/21869.

* cited by examiner

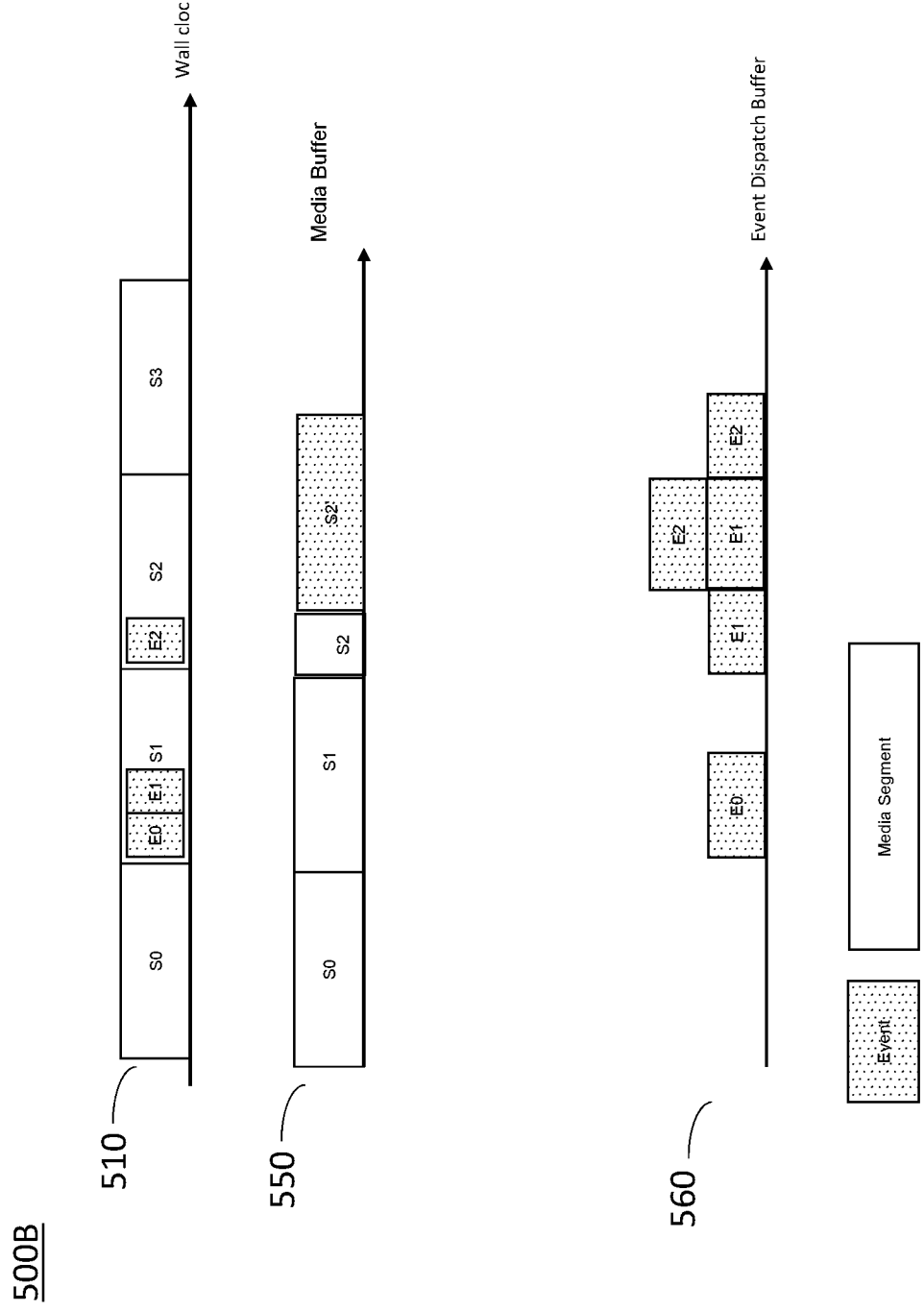

US 11,588,870 B2

W3C MEDIA EXTENSIONS FOR PROCESSING DASH AND CMAF INBAND EVENTS ALONG WITH MEDIA USING PROCESS@APPEND AND PROCESS@PLAY MODE

CROSS REFERENCE TO RELATED APPLICATION

The present application claims priority to provisional application U.S. 63/177,791, filed on Apr. 21, 2021, the contents of which are hereby expressly incorporated by reference, in their entirety, into the present application.

FIELD

Embodiments of the present disclosure are directed to the streaming media content, and more particularly to streaming media content in accordance with Moving Picture Experts Group (MPEG) dynamic adaptive streaming over hypertext transfer protocol (DASH).

BACKGROUND

MPEG DASH provides a standard for streaming media content over IP networks. In MPEG DASH, media presentation description (MPD) and inband events are used for delivering media timeline related events to a client. DASH provides a mechanism for media segments to carry inband events. ISO/IEC 23009-1 DASH standard defines event message boxes to carry events with media segments. ISO/IEC 23000-19 CMAF standard uses the inband event with CMAF chunks, fragments, and segments. Similarly, Common Media Application Format (CMAF) provides a mechanism for CMAF chunks to carry inband events. One popular DASH event is inband MPD validity expiration events. Other events include application events such as SCTE-35 ("Digital Program Insertion Cueing Message for Cable") events.

Streaming players, including DASH players, use Media Source Extensions (MSE), which allow browsers or user agents to process media segments. However, current MSE specifications do not support parsing and processing inband events embedded in DASH or CMAF media segments. A browser or user agent, utilizing the current MSE specifications is unable to natively process DASH or CMAF inband events and dispatch the inband events to the respective application.

SUMMARY

Embodiments of the present disclosure provide solutions that enable a MSE to natively process DASH and CMAF inband event boxes contained in media segments.

A method of processing events in a media stream may be provided. The method may include obtaining media data; generating, from the media data, one or more event segments and one or more media segments; parsing a respective event from the one or more event segments to determine an event start time, event end time, and dispatch mode; appending the respective event from the one or more event segments to an event dispatch buffer based on a comparison of the event start time and a current playback position, and a determination that the respective event is not present in an already dispatched buffer, wherein a position associated with the respective event in the event dispatch buffer is based on the dispatch mode of the respective event; and dispatching the respective event based on the position associated with the respective event in the event dispatch buffer, the event start time, the event end time, and the current playback position.

An apparatus for processing events in a media stream may be provided. The apparatus may include at least one memory configured to store program code; and at least one processor may be configured to read the program code and operate as instructed by the program code. The program code may include first obtaining code configured to cause the at least one processor to obtain media data; first generating code configured to cause the at least one processor to generate, from the media data, one or more event segments and one or more media segments; first parsing code configured to cause the at least one processor to parse a respective event from the one or more event segments to determine an event start time, event end time, and dispatch mode; first appending code configured to cause the at least one processor to append the respective event from the one or more event segments to an event dispatch buffer based on a comparison of the event start time and a current playback position, and a determination that the respective event is not present in an already dispatched buffer, wherein a position associated with the respective event in the event dispatch buffer is based on the dispatch mode of the respective event; and first dispatching code configured to cause the at least one processor to dispatch the respective event based on the position associated with the respective event in the event dispatch buffer, the event start time, the event end time, and the current playback position.

A non-transitory computer readable medium storing instructions for processing events in a media stream may be provided. The instructions, executed by at least one processor, may cause the at least one processor to obtain media data; generate, from the media data, one or more event segments and one or more media segments; parse a respective event from the one or more event segments to determine an event start time, event end time, and dispatch mode; append the respective event from the one or more event segments to an event dispatch buffer based on a comparison of the event start time and a current playback position, and a determination that the respective event is not present in an already dispatched buffer, wherein a position associated with the respective event in the event dispatch buffer is based on the dispatch mode of the respective event; and dispatch the respective event based on the position associated with the respective event in the event dispatch buffer, the event start time, the event end time, and the current playback position.

BRIEF DESCRIPTION OF THE DRAWINGS

Further features, nature, and various advantages of the disclosed subject matter will be more apparent from the following detailed description and the accompanying drawings in which:

FIGS. 5A and 5B are simplified diagrams of media buffer and event buffers in accordance with embodiments.

DETAILED DESCRIPTION

Embodiments of the present disclosure provide technical solutions that enable a MSE to natively process DASH and CMAF inband event boxes. In particular, embodiments of the present disclosure relate to processing models and algorithms for processing DASH inband message boxes (e.g., message box v0 and v1). Aspects of the present disclosure are directed to DASH inband message processing for schemes with an "on_receive" or an "on_start" dispatch mode. The disclosure enables browsers or user agents utilizing a MSE based on the present disclosure to natively process DASH and CMAF inband event boxes and send them to the respective application.

The proposed features discussed below may be used separately or combined in any order. Further, the embodiments may be implemented by processing circuitry (e.g., one or more processors or one or more integrated circuits). In one example, the one or more processors execute a program that is stored in a non-transitory computer-readable medium.

Figure 1:
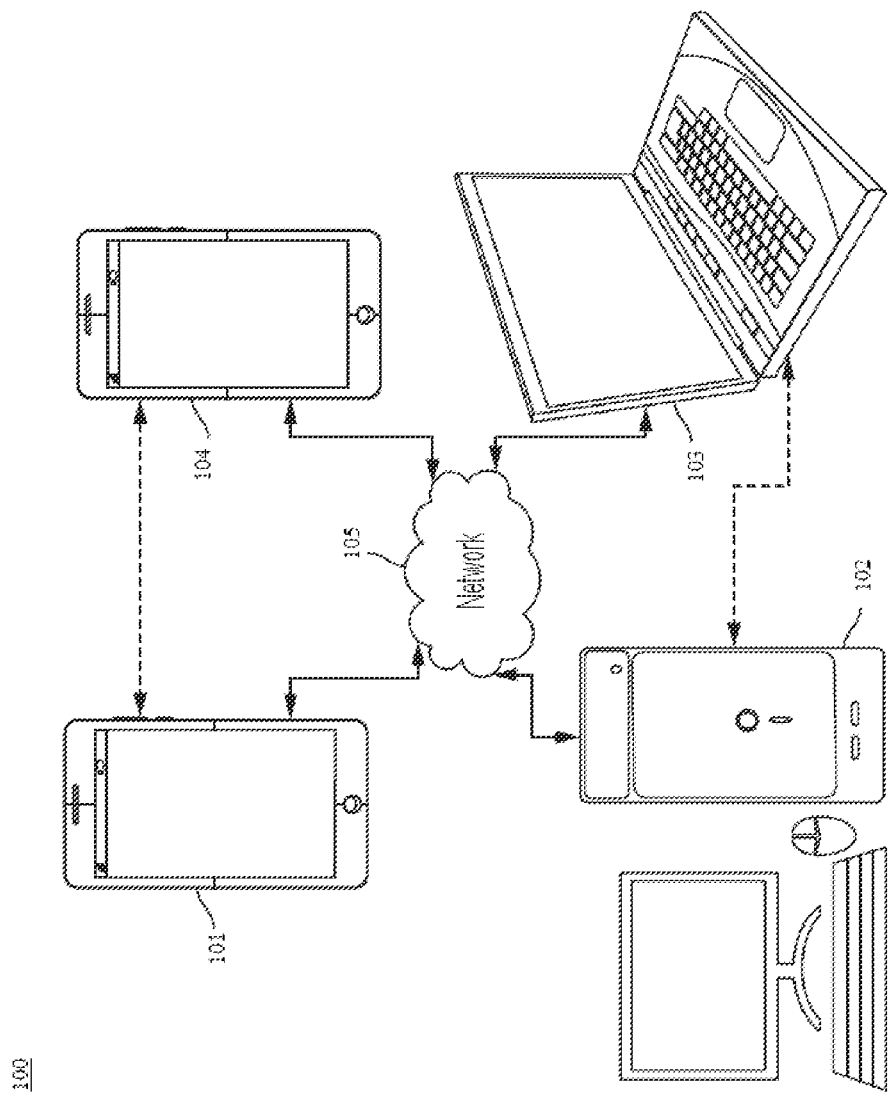
FIG. 1 is a simplified illustration of a communication system in accordance with embodiments.

FIG. 1 illustrates a simplified block diagram of a communication system 100 according to an embodiment of the present disclosure. The communication system 100 may include at least two terminals 102 and 103 interconnected via a network 105. For unidirectional transmission of data, a first terminal 103 may code video data at a local location for transmission to the other terminal 102 via the network 105. The second terminal 102 may receive the coded video data of the other terminal from the network 105, decode the coded data and display the recovered video data. Unidirectional data transmission may be common in media serving applications and the like.

FIG. 1 illustrates a second pair of terminals 101 and 104 provided to support bidirectional transmission of coded video that may occur, for example, during videoconferencing. For bidirectional transmission of data, each terminal 101 and 104 may code video data captured at a local location for transmission to the other terminal via the network 105. Each terminal 101 and 104 also may receive the coded video data transmitted by the other terminal, may decode the coded data and may display the recovered video data at a local display device.

In FIG. 1, the terminals 101, 102, 103 and 104 may be illustrated as servers, personal computers and smart phones, but the principles of the present disclosure are not so limited. Embodiments of the present disclosure find application with laptop computers, tablet computers, media players and/or dedicated video conferencing equipment. The network 105 represents any number of networks that convey coded video data among the terminals 101, 102, 103 and 104, including for example wireline and/or wireless communication networks. The communication network 105 may exchange data in circuit-switched and/or packet-switched channels. Representative networks include telecommunications networks, local area networks, wide area networks and/or the Internet. For the purposes of the present discussion, the architecture and topology of the network 105 may be immaterial to the operation of the present disclosure unless explained herein below.

Figure 2:
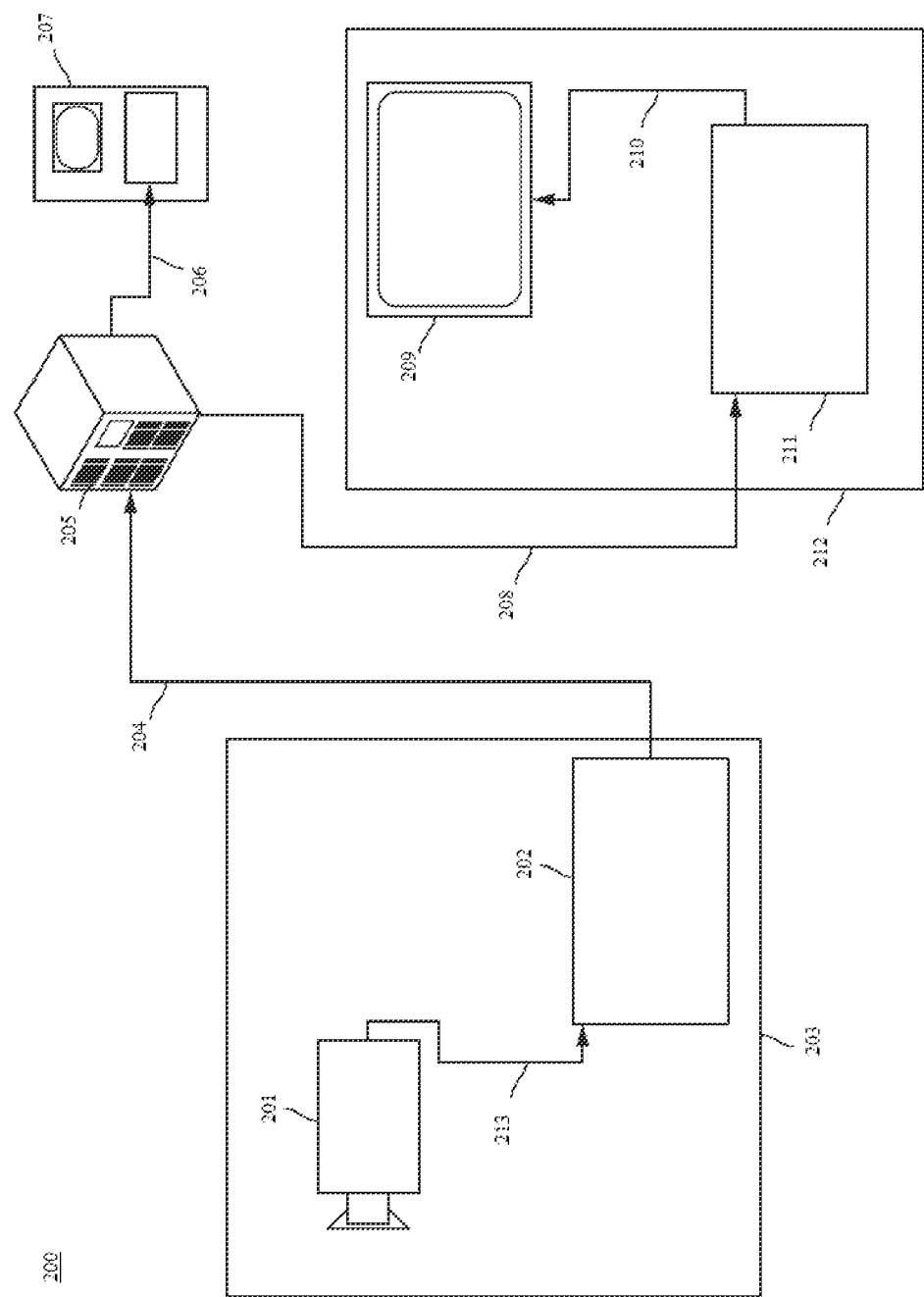
FIG. 2 is an example illustration of placements of components in a streaming environment in accordance with embodiments.

FIG. 2 illustrates, as an example, the placement of a video encoder and decoder in a streaming environment. Embodiments may be applicable to other video enabled applications, including, for example, video conferencing, digital TV, storing of compressed video on digital media including CD, DVD, memory stick and the like, and so on.

A streaming system may include a capture subsystem 203 that may include a video source 201, for example a digital camera, creating, for example, an uncompressed video sample stream 213. That sample stream 213 may be emphasized as a high data volume when compared to encoded video bitstreams and may be processed by an encoder 202 coupled to the video source 201. The encoder 202 may include hardware, software, or a combination thereof to enable or implement aspects of embodiments as described in more detail below. The encoded video bitstream 204, which may be emphasized as a lower data volume when compared to the sample stream, may be stored on a streaming server 205 for future use. One or more streaming clients 212 and 207 may access the streaming server 205 to retrieve encoded video bitstream 208 and 206 which may be copies of the encoded video bitstream 204. A client 212 may include a video decoder 211 which decodes the incoming copy of the encoded video bitstream 208 and creates an outgoing video sample stream 210 that may be rendered on a display 209 or other rendering device. In some streaming systems, the encoded video bitstreams 204, 206 and 208 may be encoded according to certain video coding/compression standards. Examples of those standards are noted above and described further herein.

Figure 3:
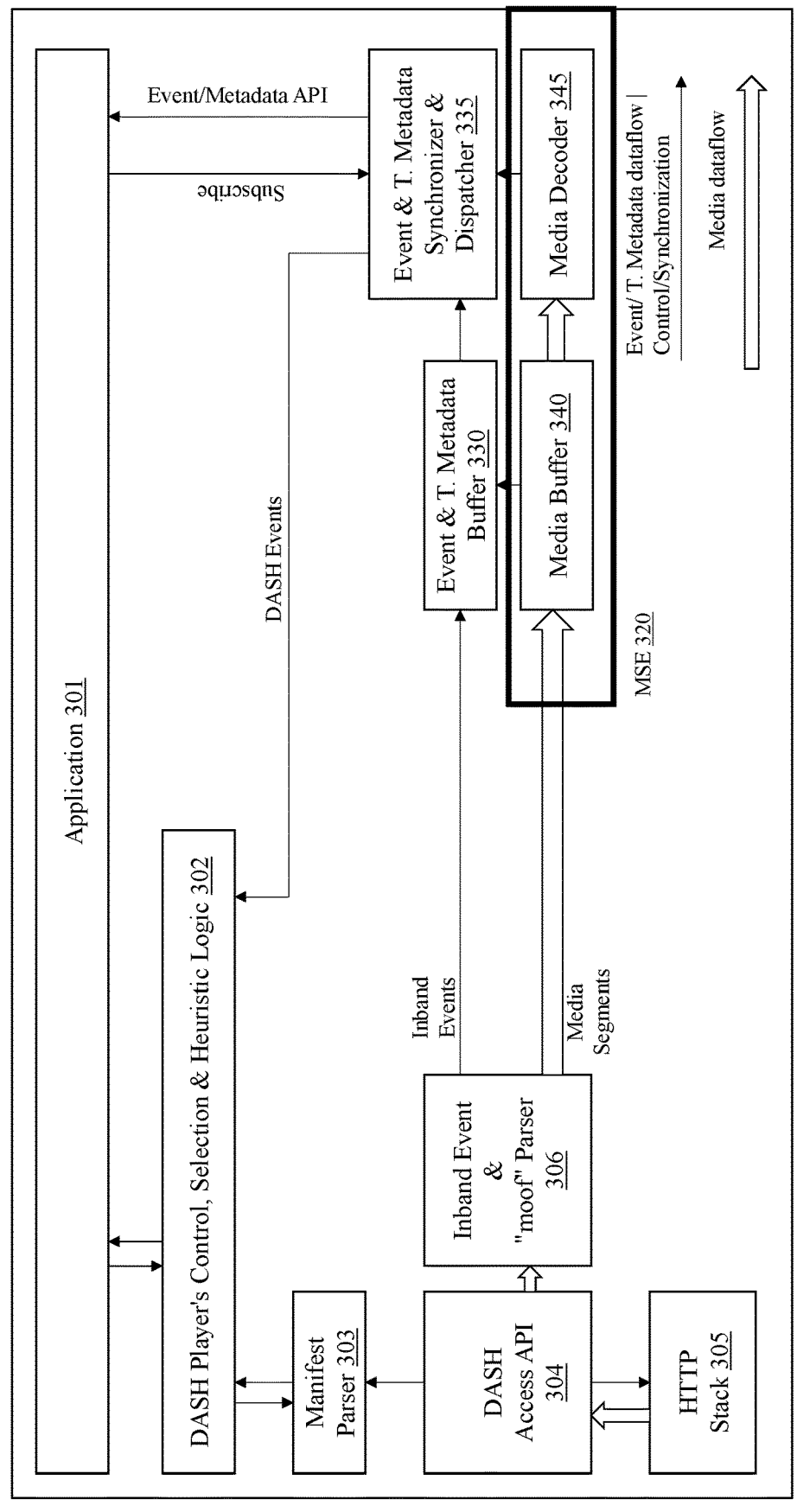
FIG. 3 is a simplified block diagram of a DASH processing model in accordance with embodiments.

FIG. 3 shows a sample DASH processing model 300, such as of a sample client architecture for processing DASH and CMAF events. In the DASH processing model 300, a client's request of media segments may be based on described addresses in a manifest 303. The manifest 303 also describes metadata tracks from which a client may access segments of metadata tracks, parse them, and send them to an application 301.

The manifest 303 may include MPD events or inband events, and an inband event and 'moof' parser 306 may parse MPD event segments or inband event segments and append the event segments to an event and metadata buffer 330. The inband event and 'moof' parser 306 may also fetch and append the media segments to a media buffer 340. The event and metadata buffer 330 may send event and metadata information to an event and metadata synchronizer and dispatcher 335. The event and metadata synchronizer and dispatcher 335 may dispatch specific events to DASH players control, selection, and heuristic logic 302 and application related events and metadata tracks to application 301.

According to some embodiments, a MSE may include the media buffer 340 and a media decoder 345. MSE 320 is a logical buffer(s) of media segments, where the media segments may be tracked and ordered based on the media segments' presentation time. Each media segment may be added or appended to the media buffer 340 based on the media segments' start time, end time, or timestamp offset, and the timestamp offset may be used to order the media segments in the media buffer 340.

As long as media segments exist in the media buffer 340, the event and metadata buffer 330 maintains corresponding event segments and metadata. According to FIG. 3, the MSE 320 may include only the media buffer 340 and the media decoder 345. The event and metadata buffer 330 and event and metadata synchronizer and dispatcher 335 are not native to the MSE 320, inhibiting the MSE 320 from natively processing events and sending them to the application.

Figure 4:
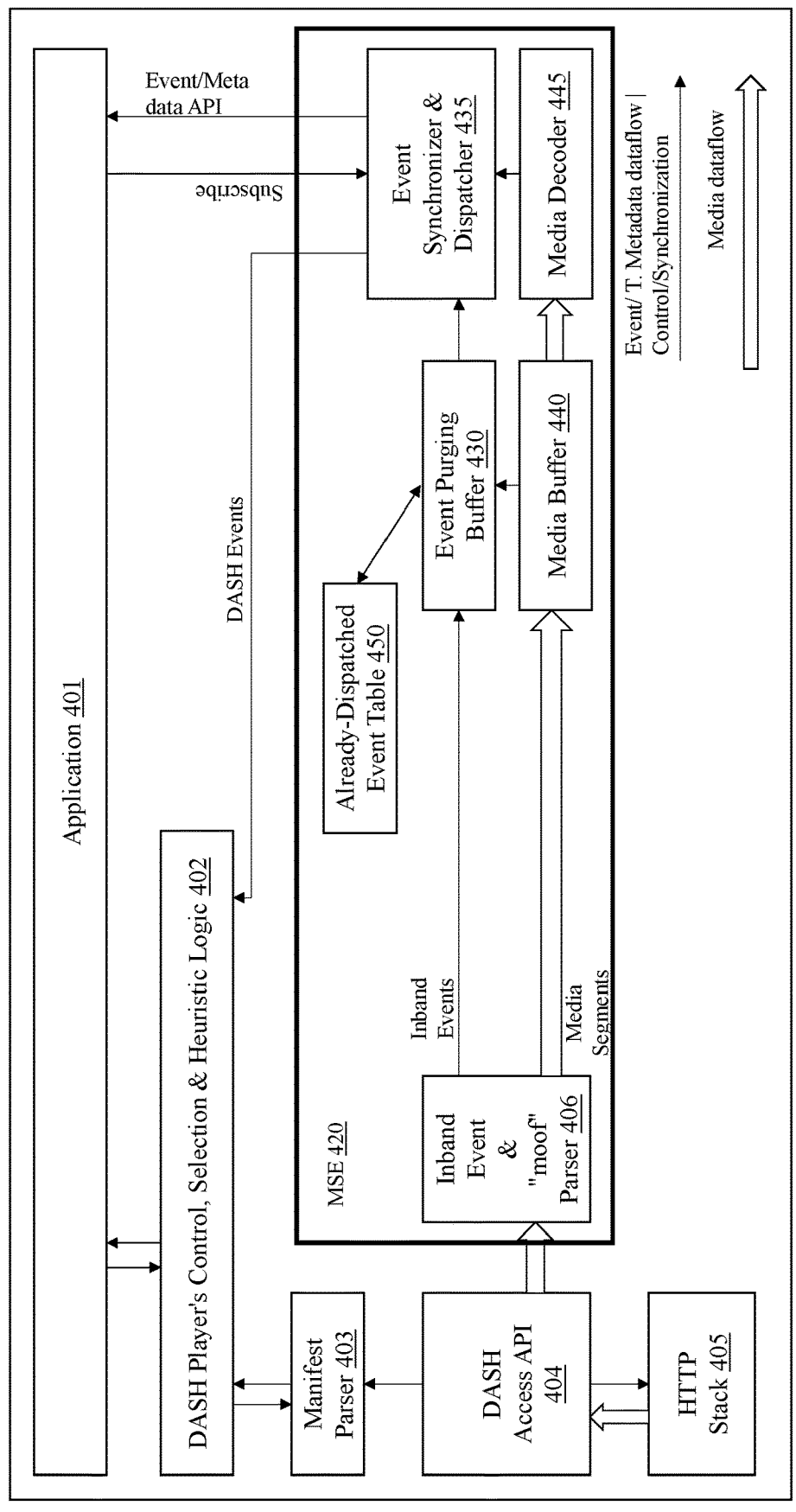
FIG. 4 is a simplified block diagram of a DASH processing model in accordance with embodiments.

FIG. 4 shows a sample DASH processing model 400, such as of a sample client architecture for processing DASH and CMAF events. In the DASH processing model 400, a client request of media segments may be based on described addresses in a manifest 403. The manifest 403 also describes metadata tracks from which a client may access segments of metadata tracks, parse them, and send them to an application 401.

The manifest 403 may include MPD events or inband events, and an inband event and 'moof' parser 406 may parse the MPD event segments or inband event segments and append the event segments to an event purging buffer 430. Based on the media data or media stream and information in the manifest 403, the inband event and 'moof' parser 406 may fetch and append the media segments to a media buffer 440. The event purging buffer 330 may send event and metadata information to an event synchronizer and dispatcher 435. The event synchronizer and dispatcher 435 may dispatch specific events to DASH players control, selection, and heuristic logic 402 and application related events and metadata tracks to application 401.

According to exemplary embodiments, in FIG. 4, the MSE is extended to include the media buffer 340, media decoder 345, event purging buffer 430, event synchronizer and dispatcher 435, and an already-dispatched event table 450. The already-dispatched event table 450 may record the events that are already dispatched to the application 401. The extension of event purging buffer 430 and event synchronizer and dispatcher 435, enables the MSE to process inband events natively and the creation of already-dispatched event table 450 enables recording and tracking of already dispatched event messages.

In exemplary embodiments, the MSE 420 or its components may dispatch events based on an event segment's or event's event start time, event end time, event specific offset, event duration, or a current playback time/position. An example may include event start time offset (which may be referred to as event start time in some embodiments). The MSE 420 or its components may determine event start time offset for an event segment, wherein the start time offset is determined with reference to event start time and a current playback time/position, and use the event start time offset to order and dispatch events in the event purging buffer 430 or event synchronizer and dispatcher 435.

In exemplary embodiments, the MSE 420 may handle event segment and media segment purging and overwriting for associated events and media. The MSE 420 may retain an event in the event purging buffer 430 or the event synchronizer and dispatcher 435 if the media segment associated with the event is retained in the media buffer 440. The MSE 420 may manage timing and duration of the event segments based on the timing and duration of the associated media segments.

In exemplary embodiments, the application 401 may set the event time, the timestamp offset, or the event time stamp offset. The application 401 may also set the scheme URI/value and the dispatch mode for the scheme URI/value. Additionally, in some embodiments, the application 401 may also set the process mode for the scheme URI/value. The MSE 420 may dispatch events based on scheme URI/value.

In some embodiments, the process mode for the scheme URI may be process@append. Process mode being process@append may cause the MSE to process event segments associated with media segments at the time of appending the associated media segment to the media buffer. Thus, based on a process mode being process@append, the event segments may be parsed, dispatched, or at least scheduled at the time of appending the associated media segment to the media buffer.

As an example, an application may set the scheme URI to reflect process@append. When the scheme URI includes process@append with an on_receive dispatch mode, one or more events associated with a media segment may be processed when the media segment is appended to the media buffer. In some embodiments, if an event of the one or more events has an end time that is not smaller than the current playback position, the event may be dispatched immediately. That is, the event will be appended to the event dispatch buffer at the current playback position and dispatched to the application. In some embodiments, the event will be immediately dispatched when the event end time is not smaller than the current playback position and the event has not been dispatched before.

In some embodiments, the scheme URI may include process@append with an on_start dispatch mode. When the dispatch mode is on_start, an event from the one or more events associated with a media segment may be processed when the media segment is appended to the media buffer, but the event may be dispatched based on the event start time, event timestamp offset, event end time, or event duration associated with the event. In some embodiments, when the scheme URI includes process@append with the on_start dispatch mode, the event may be stored at the event dispatch buffer at a position associated with the event start time if the current playback position is not smaller than the event start time, the current playback position is not equal to or larger than the event end time, and the event or an equivalent has not been dispatched before.

In some embodiments, the process mode for the scheme URI may be process@play. Process mode being process@play may cause the MSE to process event segments associated with media segments at the time of playing of the associated media segment. In some embodiments, based on a process mode being process@play, the event segments may be parsed, dispatched, or at least scheduled when the associated media segment is played or streamed. In some embodiments, when the process mode is process@play, an event segment may be dispatched if at least one media sample of the media segment that contained the event segment was already played. To implement the process@play process mode, the MSE may utilize the event purge buffer (may be referred to as purge buffer) to keep track of the event segments that have been dispatched.

Based on the scheme URI being process@play with an on_receive dispatch mode, one or more events associated with a media segment may be processed when the media segment is appended to the media buffer. In some embodiments, the processing of the event segment may include immediate dispatch i.e., appending to the event dispatch buffer at current playback position or sending event to application. The immediate dispatch may be based on the event's end time in comparison with the current playback time. As an example, an event may be immediately dispatched if the current playback position associated with a media segment containing the event's e-message (esmg) or event's identifier, if the event's end time is not smaller than the current playback position, and if the event or an equivalent has not been dispatched before.

If the scheme URI includes process@play with an on_start dispatch mode, one or more events associated with a media segment may be processed when the media segment is appended to the media buffer. The processing of the event may include being immediately dispatched. As an example, an event may be dispatched immediately if the current playback position is not smaller than the event's start time, the current playback position is not equal to or larger than the event's end time, the event is associated with a media segment containing the event's e-message (esmg) or event's identifier, and if the event or an equivalent has not been dispatched before.

In some embodiments, based on an event's end time being smaller than the current playback position or the event's identifier (e.g., emsg.id of the event) being in the already dispatched buffer, processing of that event may end and a next event may be parsed and processed.

In some embodiments, based on an event's dispatch mode being the on_receive mode, the event may be dispatched immediately, i.e., the event may be appended to the dispatch buffer at a position associated with the current playback

TABLE 1

|  | Process Mode: process@append | | Process Mode: process@play | |
| --- | --- | --- | --- | --- |
|  | Dispatch Mode: on_receive | Dispatch Mode: on_start | Dispatch Mode: on_receive | Dispatch Mode: on_start |
| Append segment and play it | Dispatch | Dispatch | Dispatch | Dispatch |
| Append segment, but skip playback | Dispatch | Dispatch | Ignore | Ignore |
| Append segment, but rewrite part of it before playback | Dispatch | Dispatch | Dispatch | Dispatch |
| Append segment, but rewrite entire segment before playback | Dispatch | Dispatch | Ignore | Ignore |
| Append segment in timeshift buffer, and purge it before playback | Dispatch | Dispatch | Ignore | Ignore |
| Append segment in timeshift buffer, and purge it after playback | Dispatch | Dispatch | Dispatch | Dispatch |
| Append, and played, purged before event start | Dispatch | Dispatch | Dispatch | Dispatch |

The above table, Table 1, describes the processing of events under different operational modes, process modes, and dispatch modes for the scheme URI.

Media data may be obtained, and one or more event segments and one or more media segments may be generated from the media data. A specific or respective event may be parsed from the one or more event segments and the event start time, event end time, and dispatch mode may be determined.

Appending the respective event to an event dispatch buffer may be based on a comparison of the event start time and a current playback position, and a determination that the respective event is not present in an already dispatched buffer. The already dispatched buffer may keep a record of event segments or event messages that have already been dispatched to an application. The position associated with the respective event in the event dispatch buffer may be based on the dispatch mode of the respective event. The respective event may be dispatched based on the position associated with the respective event in the event dispatch buffer, its event start time, its event end time, and the current playback position. In some embodiments, a purge buffer may be used. Appending the respective event to a purge buffer may include appending the respective event at a position associated with a target range, the target range may be based on the media segment start time and the media segment end time of the media segment associated with the respective event.

According to embodiments of the present disclosure, events and/or media segments with the process mode "append" or "process@append" may be processed as described below.

position. Subsequent to the appending, the event or event's identifier may be appended to the already dispatched buffer.

According to embodiments of the present disclosure, based on the event's dispatch mode being the on_start mode, the event processing may include calculating the event dispatch range for the event based on the event start time and the event end time and appending the event to the event dispatch buffer at a position associated with the event dispatch range.

As an example, event dispatch range may be determined based on the following:

For emsg v0(esmg.version=0):
$$\text{dispatch\_range\_start} = \text{segment\_start} + \text{emsg.presentation\_time\_delta}/\text{emsg.time\_scale} \quad (1)$$

For emsg v1(emsg.version=1):
$$\text{dispatch\_range\_start} = \text{emsg.presentation\_time}/\text{emsg.timescale} \quad (2)$$

$$\text{dispatch\_range\_end} = \text{dispatch\_range\_start} + \text{emsg.duration}/\text{emsg.timescale} \quad (3)$$

In some embodiments, there may be an existing overlapping event in the event dispatch buffer at a position associated with the event dispatch range for the event. Based on determining that there may be an existing overlapping event in the event dispatch buffer at a position associated with the event dispatch range for the event, the event dispatch range may be divided into a plurality of subranges such that each of the plurality of subranges is either empty or occupied with at least one event having a same status for the entirety of a subrange.

Subsequent to dividing the event dispatch buffer into a plurality of subranges, for each of the plurality of subranges occupied with at least one event, the at least one event may be divided based on a respective subrange of the plurality of subranges. These divided events may be appended to the event dispatch buffer at a position associated with the respective subrange. In some embodiments, for each divided event, event characteristics and/or properties such as Emsg.scheme_id_uri, emsg.value, emsg.id, dispatch_range_start, dispatch_duration=emsg.duration/emsg.timescale, and emsg.message_data( ), may be added.

According to embodiments, events occurring in the event dispatch buffer at the current playback position may be dispatched to an application based on the event's identifier (e.g., emsg.id) not being in the already dispatched buffer. Subsequent to dispatching the event to the application, the event may be removed from the event dispatch buffer and the event's identifier may be added to the already dispatched buffer. However, in embodiments when events occurring in the event dispatch buffer at the current playback position have their event identifiers in the already dispatched buffer, the event may be removed from the event dispatch buffer.

In some embodiments, a range from the start or end of the media buffer may be purged. The media buffer range being purged may be referred to as "media subrange." The purging may include purging the media subrange from a media buffer and based on determining that a position associated with the media subrange in the event dispatch buffer overlaps with an event dispatch range for the respective event in the event dispatch buffer, purging an overlapping subrange from the event dispatch buffer.

According to embodiments of the present disclosure, events and/or media segments with the process mode "play" or "process@play" may be processed as described below.

In some embodiments, based on an event's end time being smaller than the current playback position or the event's identifier (e.g., emsg.id of the event) being in the already dispatched buffer, processing of that event may end and a next event may be parsed and processed.

In some embodiments, based on the process mode being "play" or "process@play," an additional purge buffer may be used. An event may be appended to the purge buffer at a position associated with a target range, wherein the target range may be based on a segment start time and a segment end time of a media segment associated with the event. In some embodiments, the segment start time and the segment end time of the media segment associated with the event may be determined using a parser that may parse a media segment from the one or more media segments.

In some embodiments, the target range may be determined as follows:

purge_range_start=segment_start  (4)

purge_range_end=segment_start+segment duration  (5)

In some embodiments, there may be an overlapping event in the purge buffer at the position associated with the target range. Based on determining that there is an overlapping event in the purge buffer at the position associated with the target range, the target range in the purge buffer may be divided into a plurality of purge subranges, wherein each of the plurality of purge subranges is either empty or occupied with at least one event having a same status for the entirety of a purge subrange.

Subsequent to dividing the purge buffer into a plurality of purge subranges, for each of the plurality of purge subranges occupied with at least one event, the at least one event may be divided based on a respective purge subrange of the plurality of purge subranges. These divided events may be appended to the purge buffer at a position associated with the respective purge subrange. In some embodiments, a same event association identifier (EAI) may be assigned to each of the at least one divided event in the purge buffer at the position associated with the target range. In some embodiments, a played flag may be set false for each of the at least one divided event in the purge buffer at the position associated with the respective purge subrange, wherein the played flag may indicate whether the media segment associated with each of the at least one divided event has been played. In some embodiments, for each divided event, event characteristics and/or properties such as EAI, Emsg.scheme_id_uri, emsg.value, emsg.id, dispatch_range_start, dispatch_duration=emsg.duration/emsg.timescale, and emsg.message_data( ), may be added.

In some embodiments, based on an event's dispatch mode being the on_receive mode, the event may be dispatched immediately, i.e., the event may be appended to the dispatch buffer at a position associated with the current playback position. Subsequent to the appending, the event or event's identifier may be appended to the already dispatched buffer.

In some embodiments, based on the event's dispatch mode being the on_start mode, event processing may include calculating the event dispatch range for the event based on the event start time and the event end time and appending the event to the event dispatch buffer at a position associated with the event dispatch range.

As an example, the event dispatch range may be determined based on the following:

For emsg v0(esmg.version=0):
dispatch_range_start=purge_range_start+
emsg.presentation_time_delta/emsg.time_scale  (6)

For emsg v1(emsg.version=1):
dispatch_range_start=emsg.presentation_time/
emsg.timescale  (7)

dispatch_range_end=dispatch_range_start+emsg.duration/emsg.timescale  (8)

In some embodiments, there may be an existing overlapping event in the event dispatch buffer at a position associated with the event dispatch range for the event. Based on determining that there may be an existing overlapping event in the event dispatch buffer at a position associated with the event dispatch range for the event, the event dispatch range may be divided into a plurality of subranges such that each of the plurality of subranges is either empty or occupied with at least one event having a same status for the entirety of a subrange.

Subsequent to dividing the event dispatch buffer into a plurality of subranges, for each of the plurality of subranges occupied with at least one event, the at least one event may be divided based on a respective subrange of the plurality of subranges. These divided events may be appended to the event dispatch buffer at a position associated with the respective subrange. In some embodiments, for each divided event, event characteristics and/or properties such as EAI, Emsg.scheme_id_uri, emsg.value, emsg.id, dispatch_range_start, dispatch_duration=emsg.duration/emsg.timescale, and emsg.message_data( ), may be added. As an example, a same event association identifier (EAI) may be assigned to each of the at least one divided event in the event dispatch buffer at the position associated with the event dispatch range.

According to embodiments, events occurring in the event dispatch buffer at the current playback position may be dispatched based on the event's identifier (e.g., emsg.id) not being in the already dispatched buffer and at least one of the events in the purged buffer with the same EAI as this event having the played flag value "true." Subsequent to dispatching the event to the application, the event may be removed from the event dispatch buffer and the event's identifier may be added to the already dispatched buffer.

In some embodiments, a range from the start or end of the media buffer may be purged. The media buffer range being purged may be referred to as "media subrange." The purging may include purging the media subrange from a media buffer and determining whether a position associated with the media subrange in the event dispatch buffer overlaps with an event dispatch range for the respective event in the event dispatch buffer.

In some embodiments, based on determining that an overlapping purge subrange exists between a position associated with the media subrange in the purge buffer and the target range for the respective event in the purge buffer, an overlapping purge subrange may be purged from the purge buffer. Further, for every event in the purge buffer at the position associated with the media subrange in the purge buffer with a played flag set to false, the event may be removed from the purge buffer if no events in the purge buffer outside the position associated with the media subrange in the purge buffer have a same EAI as the removed event or no events in the purge buffer inside the position associated with the media subrange in the purge buffer have the same EAI as the removed event and have the played flag set to true.

Figure 5A:
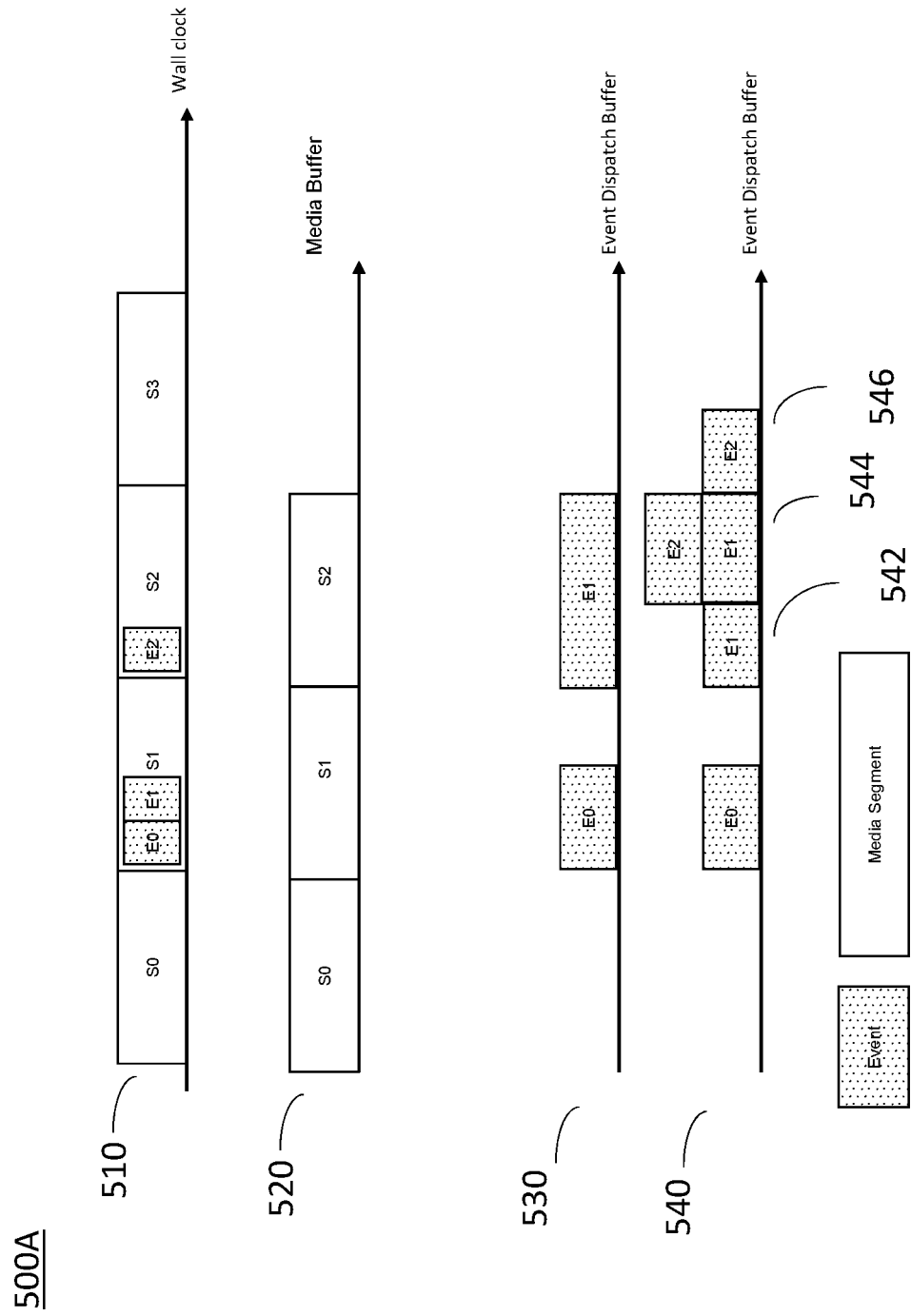

FIG. 5A describes an example media and event dispatch buffer set 500A processing media segments and event segments when the process mode for the scheme URI is process@append and the dispatch mode for the scheme URI is on_start, according to embodiments.

As shown in FIG. 5A, a media stream 510 may comprise of media segments (S0, S1, S2) and events (E0, E1, E2).

A parser may obtain media data and may generate, from the media data, one or more event segments and one or more media segments. The parser may further parse one or more events from the one or more event segments to determine an event start time, event end time, and dispatch mode. The media segments may be appended to a media source buffer or media buffer. As an example, the media segments may be appended to the media buffer 520 in the order in which the media segments are parsed or the playback time associated with the media segments. Each media segment may be associated with one or more events. In some embodiments, the one or more events and event segments may be associated with a media segment.

The events may be appended to the event dispatch buffer at a time when the media segments are appended to the media buffer. In the on_start mode, the events may be appended to the event dispatch buffer at a position based on their event start time and may map the event duration on the event dispatch buffer. As an example, as media segments S0 and S1 are appended to media buffer 520, the events E0 and E1 may be appended to the event dispatch buffer 530 based on their respective start time and may map their respective duration on the dispatch buffer 530.

In some embodiments, an event dispatch range for an event may be calculated based on the event start time and the event end time. When it is determined that that may be an overlaying event in the event dispatch buffer at a position (or range) associated with the event dispatch range for the event, the event dispatch range in the event dispatch buffer may be divided into a plurality of subranges wherein each of the plurality of subranges is either empty or occupied with at least one event having a same status for the entirety of a subrange. According to an example, when media segment S2 is appended to the media buffer 520, the associated event E2 may be appended to the event dispatch buffer 540 at a position based on event E2's start time and duration. If, as shown in FIG. 5A, there exists an overlapping event in the event dispatch buffer at the position associated with event E2's mapping (or event dispatch range), e.g., event E1, the event dispatch range may be divided into three subranges such that each subrange has either no event, or at least one event having a same status for the entirety of a subrange. As an example, event E1 may exist in the event dispatch buffer 540 within the event dispatch range of new event E2, then the event dispatch buffer 640 may be divided into three subranges, a first subrange 542 may be occupied by the non-overlapping subrange of event E1, a second subrange 544 may be occupied by the overlapping subrange between event E1 and event E2, and a third subrange 546 may be occupied the non-overlapping subrange of event E2.

FIG. 5B describes an example media and event dispatch buffer set 500B processing media segments and event segments implementing when the process mode for the scheme URI is process@append and the dispatch mode for the scheme URI is on_start, according to embodiments.

According to embodiments of the present disclosure, a media segment may be partially overwritten when the dispatch mode is on_start, that is, if an existing media segment is partially overwritten by a new media segment when the dispatch mode is on_start, then only the media buffer may be modified without modifications to the event dispatch buffer. In some embodiments, only the partially overlapping part of the existing media segment may be overwritten by the new media segment. As an example, If new media segment S2' is appended to the media buffer 550, and media segment S2' partially overlaps media segment S2, only the overlapping portion of media segment S2 on the media buffer may be overwritten.

In the process@play process mode, since the not every media segment that is appended in the media buffer is played and/or played sequentially, which media segments have been played and which media segments have not been played may be tracked using another buffer. As an example, a purge buffer may be used to keep track of or maintain association between the media samples in the media buffer and the events in the event dispatch buffer.

Figure 6A:
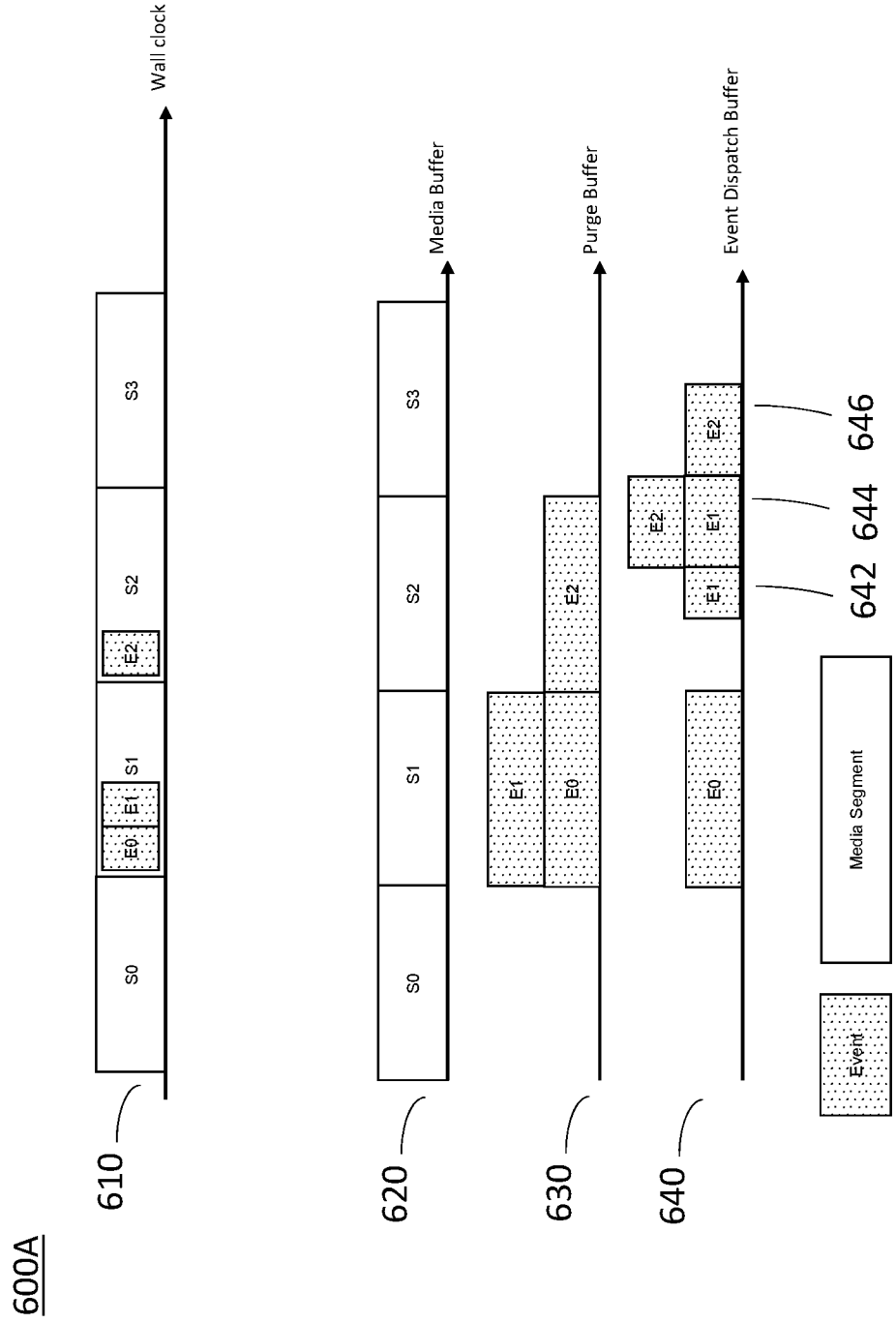
FIGS. 6A and 6B are simplified diagrams of media buffer and event buffers in accordance with embodiments.

FIG. 6A describes an example media, event dispatch, and purge buffer set 600A processing media segments and event segments when the process mode for the scheme URI is process@play and the dispatch mode for the scheme URI is on_start, according to embodiments.

As shown in FIG. 6A, a media stream 610 may include of media segments (S0, S1, S2, S4) and events (E0, E1, E2), and processing the media stream 610 may include a media buffer 620, a purge buffer 630, and an event dispatch buffer 640.

A parser may obtain media data and may generate, from the media data, one or more event segments and one or more media segments. In some embodiments, a media segment from the one or more media segments may be parsed to determine a segment start time and a segment end time, wherein the one or more events may be associated with the media segment. The media segments may be appended to the media buffer 620 in the order in which the media segments are parsed or the playback time associated with the media segments. Each media segment may be associated with one or more events.

The parser may further parse one or more events from the one or more event segments to determine an event start time, event end time, and dispatch mode. The events may be appended to the event dispatch buffer at a time when the media segments are appended to the media buffer. In the on_start mode, the events may be appended to the event dispatch buffer at a position based on their event start time and may map the event duration on the event dispatch buffer. As an example, as media segments S0 and S1 are appended to media buffer 620, the events E0 and E1 may be appended to the event dispatch buffer 6400 based on their respective start time and may map their respective duration on the dispatch buffer 640.

In some embodiments, the events may be appended to a purge buffer at a position associated with a target range, wherein the target range is based on the segment start time and the segment end time of the media segment associated with the respective event. In some embodiments, the events appended to a purge buffer may map the duration, start time, and end time of the media segments such that the events may be aligned in the purge buffer similar to the respective associated media segments in the media buffer. In exemplary embodiments, event segments (E0, E1, E2) may be appended to the event purge buffer 630 by aligning the event segments' event start time and event duration in the event purge buffer 630 with the start time and duration of the associated media segment (S0, S1, S2, S3) in the media buffer 620. As an example, one or more event's start time and event duration in the event purge buffer 530 may be aligned with the media segment start time and duration of the associated media segment or media segment end time in the media buffer 620. In some exemplary embodiments, if more than one event segment is associated with a same media segment, then each event's start time in the purge buffer may be adjusted based on the associated media segment's start time and end time.

In some embodiments, a unique event association ID (EAI) may be assigned to each event in a purge buffer which may indicate the association between media segments in the media buffer and events in the event dispatch buffer. In some embodiments, while the event's start time and end time in a purge buffer may have an identical range to that of the associated media segment, the event's actual start time and end time may be mapped in the event dispatch buffer. Since, in some embodiments, the purge buffer may be used to keep track of media segments that have been played and maintain association between the media samples in the media buffer and the events in the event dispatch buffer, the events in the event dispatch buffer may also be assigned an EAI as well.

In some embodiments, an event may be appended to the purge buffer at a position associated with a target range, wherein the target range is based on the segment start time and the segment end time of the media segment associated with the respective event. However, when appending an event to the purge buffer, if there is an overlapping event in the purge buffer at the position associated with the target range, the target range in the purge buffer may be divided into a plurality of purge subranges, wherein each of the plurality of purge subranges is either empty or occupied with at least one event having a same status for the entirety of a purge subrange.

As an example, when media segment S2 is appended to the media buffer, the associated event E2 may be appended to the event dispatch buffer 640 at a position based on event E2's start time and duration and event E2 may be appended to the purge buffer 630 at a position based on media segment S2's start time and duration. If there exists an overlapping event in the event dispatch buffer at the position associated with a new event's mapping or event dispatch range, the new event's event dispatch range may be divided into subranges so that each subrange is occupied by events that have a same status for the entire subrange. As an example, event E1 may exist in the event dispatch buffer 640 within the event dispatch range of new event E2, then the event dispatch buffer 640 may be divided into three subranges, a first subrange 642 may be occupied by the non-overlapping subrange of event E1, a second subrange 644 may be occupied by the overlapping subrange between event E1 and event E2, and a third subrange 646 may be occupied the non-overlapping subrange of event E2.

Figure 6B:
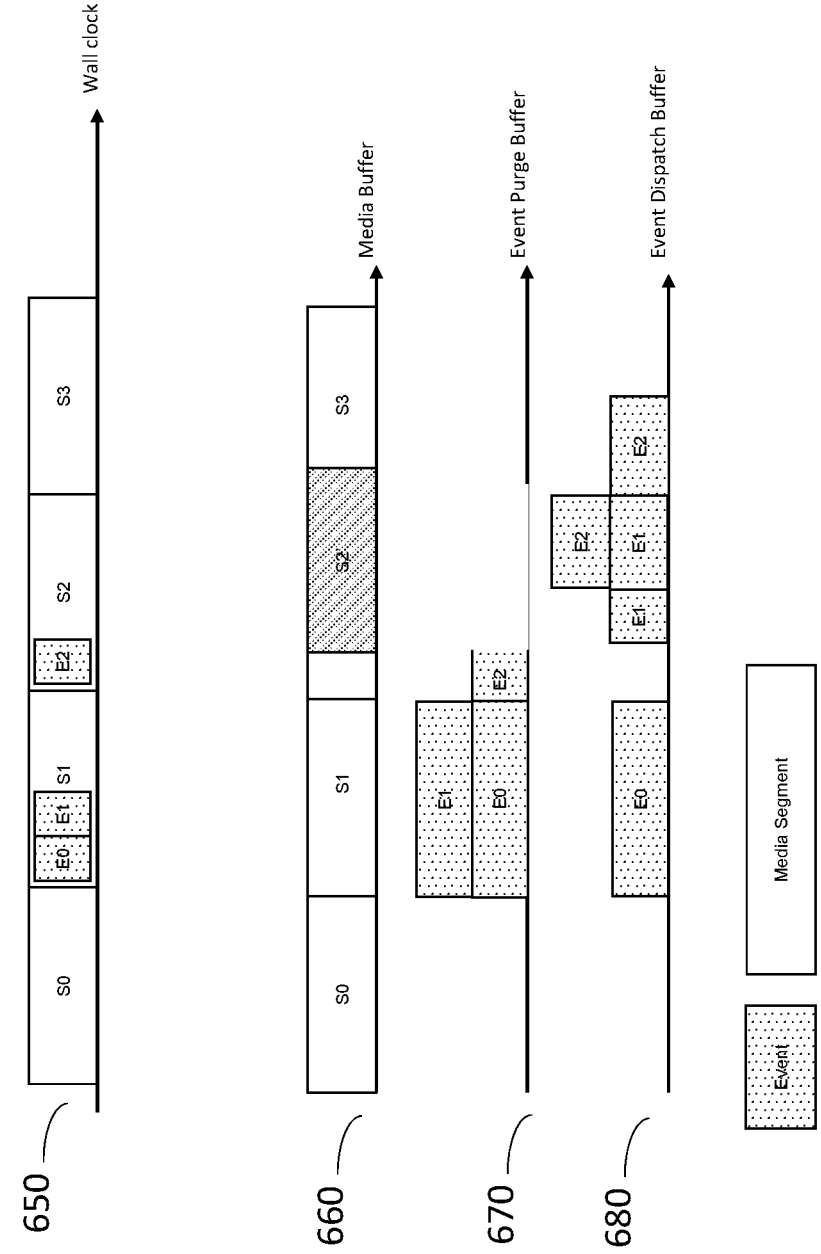

FIG. 6B describes an example media, event dispatch, and purge buffer set 600B processing media segments and event segments when the process mode for the scheme URI is process@play and the dispatch mode for the scheme URI is on_start, according to embodiments.

According to embodiments of the present disclosure, a media segment may be partially overwritten when the dispatch mode is on_start, that is, an existing media segment may be partially overwritten by a new media segment when the dispatch mode is on_start, and only the media buffer may be modified without modifications to the event dispatch buffer. In some embodiments, only the partially overlapping part of the existing media segment may be overwritten by the new media segment. As an example, If new media segment S2' is appended to the media buffer 660, and media segment S2' partially overlaps media segment S2, only the overlapping portion of media segment S2 on the media buffer 660 may be overwritten. In some embodiments, only the media buffer may be modified. In some embodiments, the event the purge buffer may be modified to reflect the media buffer. As an example, if the event E2 in the purge buffer 670 corresponding to media segment S2 may be purged or overwritten to reflect the overwritten media segment S2 in the media buffer 660.

In some embodiments, only the partially overlapping part of the existing media segment may be overwritten by the new media segment. As an example, new media segment S2' may be appended to the media buffer 660, and media segment S2' may partially overlap media segment S2, then only the overlapping portion of media segment S2 on the media buffer may be overwritten.

In some embodiments, the embodiments of the above disclosure may be implemented with a single dispatch buffer. Each event in the dispatch buffer may maintain a list of media ranges that the e-message of that event is carried. Initially, the list may only one media range, covering the media segment. However, through various operations, the media range may get split into two or more ranges. For each media range, the event may also include a flag to indicate whether the range is played or not. Changing the media ranges in the list of media ranges, updating the "played" flag, splitting the media ranges into two or more ranges and updating their respective "played" flag, may enable implementing embodiments of the present disclosure using only one buffer.

Figure 7:
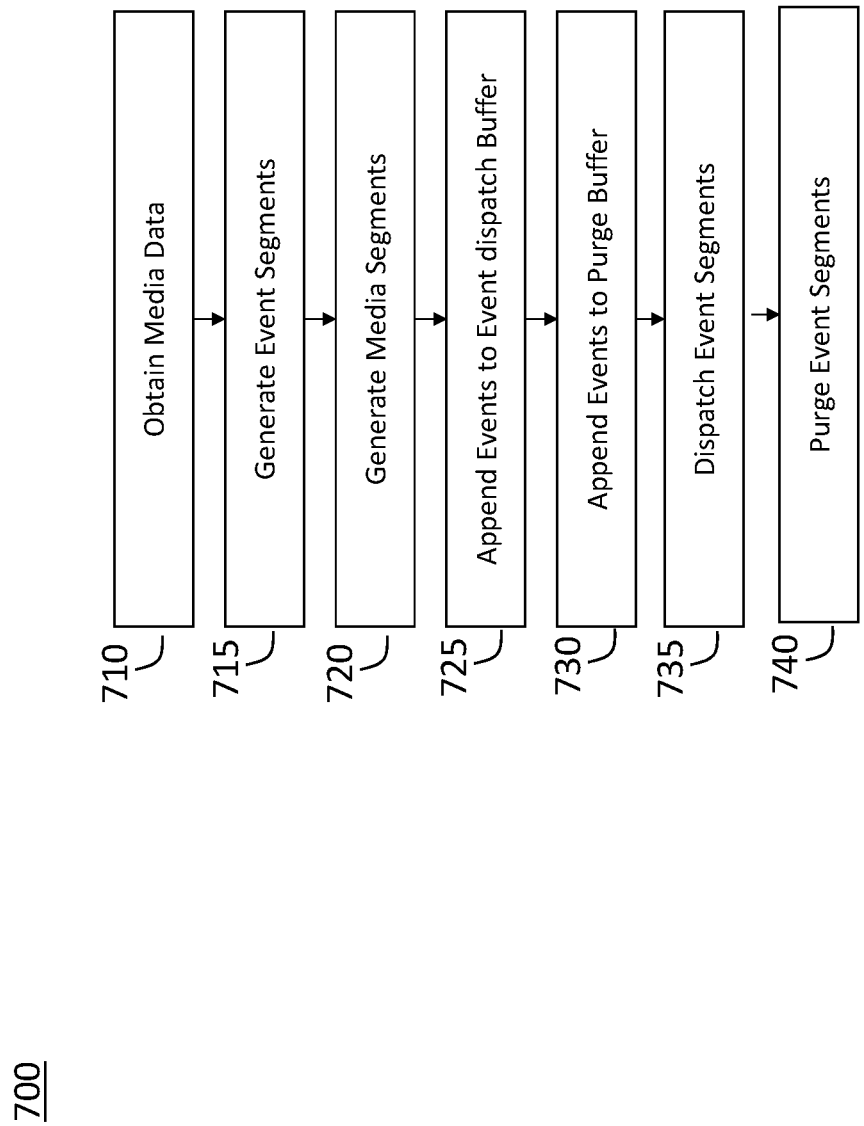
FIG. 7 is a simplified flowchart illustrating a process for processing DASH and CMAF inband events in accordance with embodiments.
Figure 8:
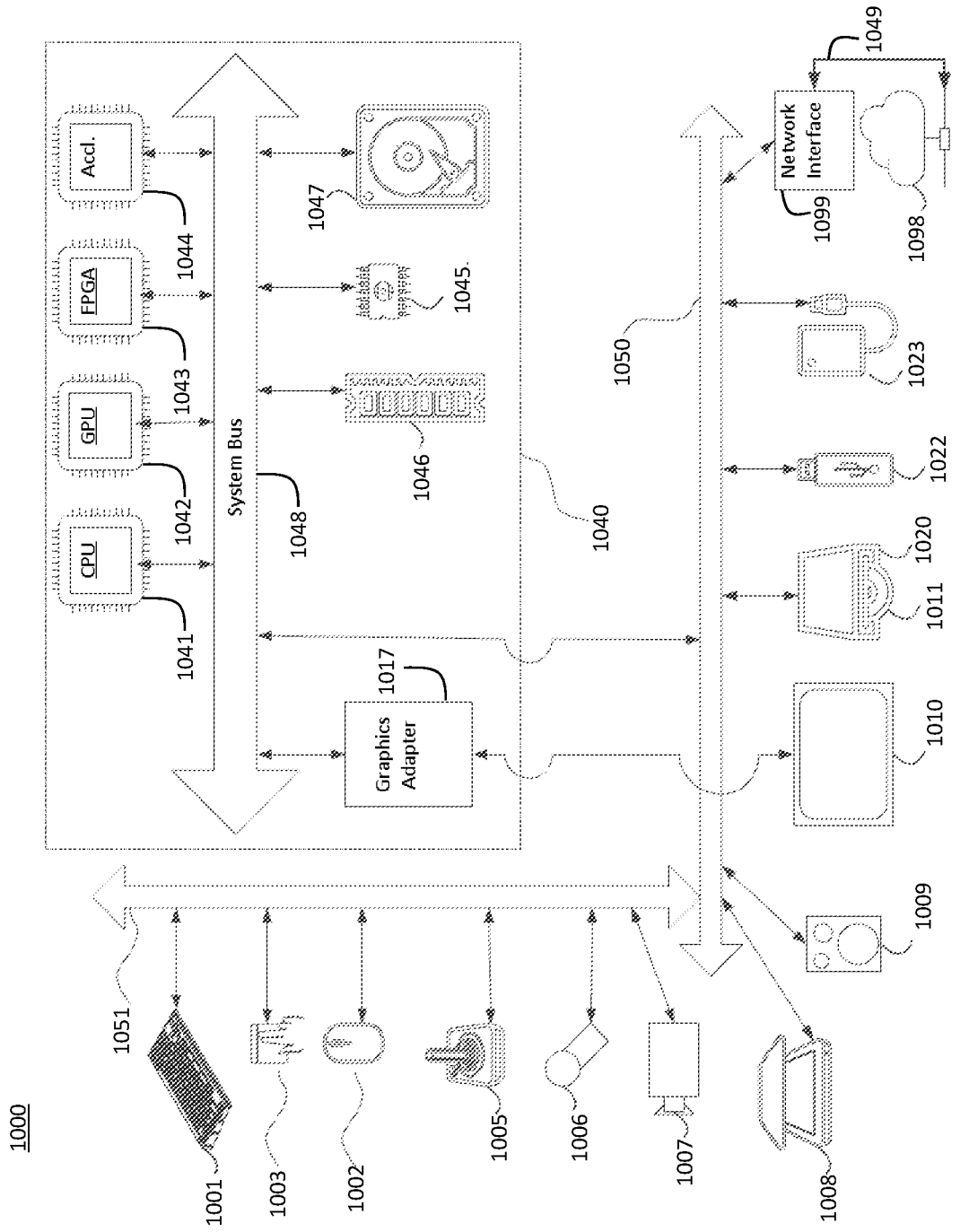
FIG. 8 is a simplified diagram of a computer system in accordance with embodiments.

FIG. 7 is an exemplary flowchart of process 700 for processing media segments and event segments, according to embodiments.

As shown in FIG. 7, at operation 710 of process 700, media data may be obtained. As an example, a parser may obtain media data.

At operation 715, one or more event segments may be generated from the media data. In some embodiments, a respective event may be parsed from the one or more event segments to determine an event start time, event end time, and dispatch mode.

At operation 720, one or more media segments may be generated from the media data. In some embodiments, a media segment from the one or more media segments may be parsed to determine a segment start time and a segment end time.

In some embodiments, in process 700, the one or more events may be associated with the media segment, and the respective event may be associated with the media segment At operation 725, the respective event from the one or more event segments may be appended to an event dispatch buffer based on a comparison of the event start time and a current playback position, and a determination that the respective event is not present in an already dispatched buffer, and the position associated with the respective event in the event dispatch buffer may be based on the dispatch mode of the respective event.

In some embodiments, at operation 725, based on the process mode being append and based on the event's dispatch mode being the on_start mode, the event processing may include calculating the event dispatch range for the event based on the event start time and the event end time and appending the event to the event dispatch buffer at a position associated with the event dispatch range. In some embodiments, there may be an existing overlapping event in the event dispatch buffer at a position associated with the event dispatch range for the event. Based on determining that there may be an existing overlapping event in the event dispatch buffer at a position associated with the event dispatch range for the event, the event dispatch range may be divided into a plurality of subranges such that each of the plurality of subranges is either empty or occupied with at least one event having a same status for the entirety of a subrange. Subsequent to dividing the event dispatch buffer into a plurality of subranges, for each of the plurality of subranges occupied with at least one event, the at least one event may be divided based on a respective subrange of the plurality of subranges. These divided events may be appended to the event dispatch buffer at a position associated with the respective subrange.

In some embodiments, at operation 725, based on the process mode being play and based on the event's dispatch mode being the on_start mode, event processing may include calculating the event dispatch range for the event based on the event start time and the event end time and appending the event to the event dispatch buffer at a position associated with the event dispatch range. In some embodiments, there may be an existing overlapping event in the event dispatch buffer at a position associated with the event dispatch range for the event. Based on determining that there may be an existing overlapping event in the event dispatch buffer at a position associated with the event dispatch range for the event, the event dispatch range may be divided into a plurality of subranges such that each of the plurality of subranges is either empty or occupied with at least one event having a same status for the entirety of a subrange. Subsequent to dividing the event dispatch buffer into a plurality of subranges, for each of the plurality of subranges occupied with at least one event, the at least one event may be divided based on a respective subrange of the plurality of subranges. These divided events may be appended to the event dispatch buffer at a position associated with the respective subrange.

At operation 730, based on the process mode being play, an additional purge buffer may be used. An event may be appended to the purge buffer at a position associated with a target range, wherein the target range may be based on a segment start time and a segment end time of a media segment associated with the event. In some embodiments, the segment start time and the segment end time of the media segment associated with the event may be determined using a parser that may parse a media segment from the one or more media segments. In some embodiments, there may be an overlapping event in the purge buffer at the position associated with the target range. Based on determining that there is an overlapping event in the purge buffer at the position associated with the target range, the target range in the purge buffer may be divided into a plurality of purge subranges, wherein each of the plurality of purge subranges is either empty or occupied with at least one event having a same status for the entirety of a purge subrange. Subsequent to dividing the purge buffer into a plurality of purge subranges, for each of the plurality of purge subranges occupied with at least one event, the at least one event may be divided based on a respective purge subrange of the plurality of purge subranges. These divided events may be appended to the purge buffer at a position associated with the respective purge subrange.

At operation 735, the respective event may be dispatched based on the position associated with the respective event in the event dispatch buffer, the event start time, the event end time, and the current playback position. In some embodiments, based on an event's dispatch mode being the on_receive mode, the event may be dispatched immediately, i.e., the event may be appended to the dispatch buffer at a position associated with the current playback position. Subsequent to the appending, the event or event's identifier may be appended to the already dispatched buffer.

In some embodiments, with the process mode being append, events occurring in the event dispatch buffer at the current playback position may be dispatched based on the event's identifier (e.g., emsg.id) not being in the already dispatched buffer. Subsequent to dispatching the event to the application, the event may be removed from the event dispatch buffer and the event's identifier may be added to the already dispatched buffer. However, in embodiments when events occurring in the event dispatch buffer at the current playback position have their event identifiers in the already dispatched buffer, the event may be removed from the event dispatch buffer.

In some embodiments, with the process mode being play, events occurring in the event dispatch buffer at the current playback position may be dispatched based on the event's identifier (e.g., emsg.id) not being in the already dispatched buffer and at least one of the events in the purged buffer with the same EAI as this event having the played flag value "true." Subsequent to dispatching the event to the application, the event may be removed from the event dispatch buffer and the event's identifier may be added to the already dispatched buffer.

At operation 740, purging the event segment when the process mode is append may include a range from the start or end of the media buffer to be purged. The media buffer range being purged may be referred to as "media subrange." The purging may include purging the media subrange from a media buffer and based on determining that a position associated with the media subrange in the event dispatch buffer overlaps with an event dispatch range for the respective event in the event dispatch buffer, purging an overlapping subrange from the event dispatch buffer.

In some embodiments, purging the event segment when the process mode is play may include a range from the start or end of the media buffer to be purged. The media buffer range being purged may be referred to as "media subrange." The purging may include purging the media subrange from a media buffer and determining whether a position associated with the media subrange in the event dispatch buffer overlaps with an event dispatch range for the respective event in the event dispatch buffer.

In some embodiments, based on determining that an overlapping purge subrange exists between a position associated with the media subrange in the purge buffer and the target range for the respective event in the purge buffer, an overlapping purge subrange may be purged from the purge buffer. Further, for every event in the purge buffer at the position associated with the media subrange in the purge buffer with a played flag set to false, the event may be removed from the purge buffer if no events in the purge buffer outside the position associated with the media subrange in the purge buffer have a same EAI as the removed event or no events in the purge buffer inside the position associated with the media subrange in the purge buffer have the same EAI as the removed event and have the played flag set to true.

The techniques described above, may be implemented as computer software using computer-readable instructions and physically stored in one or more computer-readable media or by a specifically configured one or more hardware processors. For example, FIG. 10 shows a computer system 1000 suitable for implementing various embodiments.

The computer software may be coded using any suitable machine code or computer language, that may be subject to assembly, compilation, linking, or like mechanisms to create code comprising instructions that may be executed directly, or through interpretation, micro-code execution, and the like, by computer central processing units (CPUs), Graphics Processing Units (GPUs), and the like.

The instructions may be executed on various types of computers or components thereof, including, for example, personal computers, tablet computers, servers, smartphones, gaming devices, internet of things devices, and the like.

The components shown in FIG. 10 for computer system 1000 are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system 1000.

Computer system 1000 may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input. The human interface devices may also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard 1001, mouse 1002, trackpad 1003, touch screen 1010, joystick 1005, microphone 1006, scanner 1008, camera 1007.

Computer system 1000 may also include certain human interface output devices. Such human interface output devices may be stimulating the senses of one or more human users through, for example, tactile output, sound, light, and smell/taste. Such human interface output devices may include tactile output devices (for example tactile feedback by the touch screen 1010, or joystick 1005, but there may also be tactile feedback devices that do not serve as input devices), audio output devices (such as: speakers 1009, headphones), visual output devices (such as screens 1010 to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses, holographic displays and smoke tanks), and printers.

Computer system 1000 may also include human accessible storage devices and their associated media such as optical media including CD/DVD ROM/RW 1020 with CD/DVD 1011 or the like media, thumb-drive 1022, removable hard drive or solid state drive 1023, legacy magnetic media such as tape and floppy disc, specialized ROM/ASIC/PLD based devices such as security dongles, and the like.

Those skilled in the art should also understand that term "computer readable media" as used in connection with the presently disclosed subject matter does not encompass transmission media, carrier waves, or other transitory signals.

Computer system 1000 may also include interface 1099 to one or more communication networks 1098. Networks 1098 may for example be wireless, wireline, optical. Networks 1098 may further be local, wide-area, metropolitan, vehicular and industrial, real-time, delay-tolerant, and so on. Examples of networks 1098 include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks 1098 commonly require external network interface adapters that attached to certain general-purpose data ports or peripheral buses (1050 and 1051) (such as, for example USB ports of the computer system 1000; others are commonly integrated into the core of the computer system 1000 by attachment to a system bus as described below (for example Ethernet interface into a PC computer system or cellular network interface into a smartphone computer system). Using any of these networks 1098, computer system 1000 may communicate with other entities. Such communication may be uni-directional, receive only (for example, broadcast TV), uni-directional send-only (for example CANbusto certain CANbus devices), or bi-directional, for example to other computer systems using local or wide area digital networks. Certain protocols and protocol stacks may be used on each of those networks and network interfaces as described above.

Aforementioned human interface devices, human-accessible storage devices, and network interfaces may be attached to a core 1040 of the computer system 1000.

The core 1040 may include one or more Central Processing Units (CPU) 1041, Graphics Processing Units (GPU) 1042, a graphics adapter 1017, specialized programmable processing units in the form of Field Programmable Gate Areas (FPGA) 1043, hardware accelerators for certain tasks 1044, and so forth. These devices, along with Read-only memory (ROM) 1045, Random-access memory 1046, internal mass storage such as internal non-user accessible hard drives, SSDs, and the like 1047, may be connected through a system bus 1048. In some computer systems, the system bus 1048 may be accessible in the form of one or more physical plugs to enable extensions by additional CPUs, GPU, and the like. The peripheral devices may be attached either directly to the core's system bus 1048, or through a peripheral bus 1051. Architectures for a peripheral bus include PCI, USB, and the like.

CPUs 1041, GPUs 1042, FPGAs 1043, and accelerators 1044 may execute certain instructions that, in combination, may make up the aforementioned computer code. That computer code may be stored in ROM 1045 or RAM 1046. Transitional data may be also be stored in RAM 1046, whereas permanent data may be stored for example, in the internal mass storage 1047. Fast storage and retrieval to any of the memory devices may be enabled through the use of cache memory, that may be closely associated with one or more CPU 1041, GPU 1042, mass storage 1047, ROM 1045, RAM 1046, and the like.

The computer readable media may have computer code thereon for performing various computer-implemented operations. The media and computer code may be those specially designed and constructed for the purposes of the present disclosure, or they may be of the kind well known and available to those having skill in the computer software arts.

As an example and not by way of limitation, the computer system 1000 having the illustrated architecture, and specifically the core 1040 may provide functionality as a result of processor(s) (including CPUs, GPUs, FPGA, accelerators, and the like) executing software embodied in one or more tangible, computer-readable media. Such computer-readable media may be media associated with user-accessible mass storage as introduced above, as well as certain storage of the core 1040 that are of non-transitory nature, such as core-internal mass storage 1047 or ROM 1045. The software implementing various embodiments of the present disclosure may be stored in such devices and executed by core 1040. A computer-readable medium may include one or more memory devices or chips, according to particular needs. The software may cause the core 1040 and specifically the processors therein (including CPU, GPU, FPGA, and the like) to execute particular processes or particular parts of particular processes described herein, including defining data structures stored in RAM 1046 and modifying such data structures according to the processes defined by the software. In addition or as an alternative, the computer system may provide functionality as a result of logic hard-wired or otherwise embodied in a circuit (for example: accelerator 1044), which may operate in place of or together with software to execute particular processes or particular parts of particular processes described herein. Reference to software may encompass logic, and vice versa, where appropriate. Reference to a computer-readable media may encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method of processing events in a media stream, performed by at least one processor, the method comprising:
    obtaining media data;
    generating, from the media data, one or more event segments and one or more media segments;
    parsing a respective event from the one or more event segments to determine an event start time, an event end time, and a dispatch mode;
    appending the respective event from the one or more event segments to an event dispatch buffer based on a comparison of the event start time and a current playback position, and a determination that the respective event is not present in an already dispatched buffer, wherein a position associated with the respective event in the event dispatch buffer is based on the dispatch mode of the respective event; and
    dispatching the respective event based on the position associated with the respective event in the event dispatch buffer, the event start time, the event end time, and the current playback position.

2. The method according to claim 1, further comprising:
    parsing another event from the one or more event segments in response to determining that the event end time for the respective event is smaller than the current playback position or that the respective event is present in the already dispatched buffer.

3. The method according to claim 1, further comprising:
    appending the respective event to the event dispatch buffer at a position associated with the current playback position based on the dispatch mode of the respective event being an on_receive mode; and
    subsequent to appending the respective event to the event dispatch buffer, adding the respective event to the already dispatched buffer.

4. The method according to claim 1, wherein the appending the respective event to the event dispatch buffer comprises:
    determining that the dispatch mode of the respective event is an on_start mode;
    calculating an event dispatch range for the respective event based on the event start time and the event end time; and
    dividing the event dispatch range in the event dispatch buffer into a plurality of subranges based on determining that there is an overlapping event in the event dispatch buffer at a position associated with the event dispatch range for the respective event, wherein each of the plurality of subranges is either empty or occupied with at least one event having a same status for the entirety of a subrange.

5. The method according to claim 4, further comprising:
    for each of the plurality of subranges occupied with at least one event, dividing the at least one event based on a respective subrange of the plurality of subranges; and
    appending the at least one divided event to the event dispatch buffer at a position associated with the respective subrange.

6. The method according to claim 1, further comprising:
    parsing a media segment from the one or more media segments to determine a segment start time and a segment end time, wherein the one or more events are associated with the media segment, and wherein the respective event is associated with the media segment; and
    appending the respective event to a purge buffer at a position associated with a target range, wherein the target range is based on the segment start time and the segment end time of the media segment associated with the respective event.

7. The method according to claim 6, wherein the appending the respective event to the purge buffer comprises:
dividing the target range in the purge buffer into a plurality of purge subranges, based on determining that there is an overlapping event in the purge buffer at the position associated with the target range, wherein each of the plurality of purge subranges is either empty or occupied with at least one event having a same status for the entirety of a purge subrange;
for each of the plurality of purge subranges occupied with at least one event, dividing the at least one event based on a respective purge subrange of the plurality of purge subranges; and
appending the at least one divided event to the purge buffer at a position associated with the respective purge subrange.

8. The method according to claim 7, wherein the appending the at least one divided event to the purge buffer at a position associated with the respective purge subrange comprises:
assigning a same event association identifier (EAI) to each of the at least one divided event in the purge buffer at the position associated with the target range; and
setting a played flag as false for each of the at least one divided event in the purge buffer at the position associated with the respective purge subrange, wherein the played flag indicates whether a media segment associated with each of the at least one divided event has been played.

9. The method according to claim 6, wherein the appending the respective event to the event dispatch buffer comprises:
determining that the dispatch mode of the respective event is an on_start mode;
calculating an event dispatch range for the respective event based on the event start time and the event end time;
dividing the event dispatch range in the event dispatch buffer into a plurality of subranges, based on determining that there is an overlapping event in the event dispatch buffer at a position associated with the event dispatch range for the respective event, wherein each of the plurality of subranges is either empty or occupied with at least one event having a same status for the entirety of a subrange;
for each of the plurality of subranges occupied with at least one event, dividing the at least one event based on a respective subrange of the plurality of subranges; and
appending the at least one divided event to the event dispatch buffer at a position associated with the respective subrange.

10. The method according to claim 9, wherein the appending the at least one divided event to the event dispatch buffer at a position associated with the respective subrange comprises:
assigning a same event association identifier (EAI) to each of the at least one divided event in the event dispatch buffer at the position associated with the event dispatch range.

11. The method according to claim 6, further comprising:
purging a media subrange from a media buffer;
based on determining that an overlapping purge subrange exists between a position associated with the media subrange in the purge buffer and the target range for the respective event in the purge buffer, purging an overlapping purge subrange from the purge buffer; and
for events in the purge buffer at the position associated with the media subrange in the purge buffer with a played flag set to false:
removing the event from the purge buffer; and
removing the event from the event dispatch buffer based on determining at least one of:
no events in the purge buffer outside the position associated with the media subrange in the purge buffer have a same EAI as the removed event; and
no events in the purge buffer inside the position associated with the media subrange in the purge buffer have the same EAI as the removed event and have the played flag set to true.

12. The method according to claim 1, the method further comprising:
purging a media subrange from a media buffer; and
based on determining that a position associated with the media subrange in the event dispatch buffer overlaps with an event dispatch range for the respective event in the event dispatch buffer, purging an overlapping subrange from the event dispatch buffer.

13. The method of claim 1, wherein the dispatch mode is a property of an event scheme chosen by an event owner, and wherein process mode is a property of an event scheme chosen by the event owner.

14. An apparatus comprising:
at least one memory configured to store program code; and
at least one processor configured to read the program code and operate as instructed by the program code, the program code comprising:
first obtaining code configured to cause the at least one processor to obtain media data;
first generating code configured to cause the at least one processor to generate, from the media data, one or more event segments and one or more media segments;
first parsing code configured to cause the at least one processor to parse a respective event from the one or more event segments to determine an event start time, an event end time, and a dispatch mode;
first appending code configured to cause the at least one processor to append the respective event from the one or more event segments to an event dispatch buffer based on a comparison of the event start time and a current playback position, and a determination that the respective event is not present in an already dispatched buffer, wherein a position associated with the respective event in the event dispatch buffer is based on the dispatch mode of the respective event; and
first dispatching code configured to cause the at least one processor to dispatch the respective event based on the position associated with the respective event in the event dispatch buffer, the event start time, the event end time, and the current playback position.

15. The apparatus of claim 14, wherein the first appending code further comprises:
dispatch mode determining code configured to cause the at least one processor to determine that the dispatch mode of the respective event is an on_start mode;
first calculating code configured to cause the at least one processor to calculate an event dispatch range for the respective event based on the event start time and the event end time; and first dividing code configured to cause the at least one processor to divide the event dispatch range in the event dispatch buffer into a plurality of subranges based on determining that there is an overlapping event in the event dispatch buffer at a position associated with the event dispatch range for the respective event, wherein each of the plurality of subranges is either empty or occupied with at least one event having a same status for the entirety of a subrange.

16. The apparatus of claim 15, wherein the first appending code further comprises:
    event dividing code configured to cause the at least one processor to, for each of the plurality of subranges occupied with at least one event, divide the at least one event based on a respective subrange of the plurality of subranges; and
    second appending code configured to cause the at least one processor to append the at least one divided event to the event dispatch buffer at a position associated with the respective subrange.

17. The apparatus of claim 14, wherein the program code further comprises:
    second parsing code configured to cause the at least one processor to parse a media segment from the one or more media segments to determine a segment start time and a segment end time, wherein the one or more events are associated with the media segment, and wherein the respective event is associated with the media segment; and
    third appending code configured to cause the at least one processor to append the respective event to a purge buffer at a position associated with a target range, wherein the target range is based on the segment start time and the segment end time of the media segment associated with the respective event.

18. The apparatus of claim 17, wherein the third appending code further comprises:
    second dividing code configured to cause the at least one processor to divide the target range in the purge buffer into a plurality of purge subranges, based on determining that there is an overlapping event in the purge buffer at the position associated with the target range, wherein each of the plurality of purge subranges is either empty or occupied with at least one event having a same status for the entirety of a purge subrange;
    purge event dividing code configured to cause the at least one processor to, for each of the plurality of purge subranges occupied with at least one event, divide the at least one event based on a respective purge subrange of the plurality of purge subranges; and
    fourth appending code configured to cause the at least one processor to append the at least one divided event to the purge buffer at a position associated with the respective purge subrange.

19. The apparatus of claim 18, wherein the fourth appending code further comprises:
    first assigning code configured to cause the at least one processor to assign a same event association identifier (EAI) to each of the at least one divided event in the purge buffer at the position associated with the target range; and
    first setting code configured to cause the at least one processor to set a played flag as false for each of the at least one divided event in the purge buffer at the position associated with the respective purge subrange, wherein the played flag indicates whether a media segment associated with each of the at least one divided event has been played.

20. A non-transitory computer-readable medium storing instructions that, when executed by at least one processor, causes the at least one processor to:
    obtain media data;
    generate, from the media data, one or more event segments and one or more media segments;
    parse a respective event from the one or more event segments to determine an event start time, an event end time, and a dispatch mode;
    append the respective event from the one or more event segments to an event dispatch buffer based on a comparison of the event start time and a current playback position, and a determination that the respective event is not present in an already dispatched buffer, wherein a position associated with the respective event in the event dispatch buffer is based on the dispatch mode of the respective event; and
    dispatch the respective event based on the position associated with the respective event in the event dispatch buffer, the event start time, the event end time, and the current playback position.

* * * * *